United States Patent
Anglin et al.

(10) Patent No.: US 10,094,294 B1
(45) Date of Patent: Oct. 9, 2018

(54) NUT WITH AIR SEAL

(71) Applicant: United Technologies Corporation, Farmington, CT (US)

(72) Inventors: Christopher T. Anglin, Manchester, CT (US); Yuk-Kwan Brian Yuen, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/483,458

(22) Filed: Apr. 10, 2017

(51) Int. Cl.
*F02C 3/04* (2006.01)
*F02C 7/28* (2006.01)
*F02C 7/06* (2006.01)
*F16J 15/06* (2006.01)
*F16C 33/76* (2006.01)

(52) U.S. Cl.
CPC .......... *F02C 7/28* (2013.01); *F02C 7/06* (2013.01); *F16C 33/768* (2013.01); *F16J 15/06* (2013.01); *F02C 3/04* (2013.01); *F05D 2220/32* (2013.01); *F05D 2300/224* (2013.01); *F16C 2360/23* (2013.01)

(58) Field of Classification Search
CPC ...... F02C 7/28; F02C 7/06; F02C 3/04; F16C 33/768; F16C 2360/23; F05D 2220/32; F05D 2300/224; F16J 15/06; F16J 15/447; F16J 15/4472; F16J 15/4474
See application file for complete search history.

(56) References Cited

U.S. PATENT DOCUMENTS

| | | | | |
|---|---|---|---|---|
| 5,173,024 A | * | 12/1992 | Mouchel | F01D 5/066 416/220 R |
| 5,211,535 A | * | 5/1993 | Martin | F01D 11/02 277/413 |
| 5,816,776 A | * | 10/1998 | Chambon | F01D 5/066 415/174.5 |
| 6,513,335 B2 | | 2/2003 | Fukutani | |
| 6,749,400 B2 | * | 6/2004 | Dougherty | F01D 5/081 415/115 |
| 7,690,206 B2 | | 4/2010 | Servant | |
| 7,870,744 B2 | | 1/2011 | Galivel et al. | |
| 2016/0169040 A1 | | 6/2016 | Anglin et al. | |
| 2016/0362994 A1 | | 12/2016 | Anglin et al. | |
| 2018/0031002 A1 | * | 2/2018 | Yuen | F04D 29/5853 |

* cited by examiner

*Primary Examiner* — Gilbert Y Lee
(74) *Attorney, Agent, or Firm* — Kinney & Lange, P.A.

(57) ABSTRACT

A seal assembly for a bearing compartment includes a coupler with a lip, seal plate, nut, and air seal land. The seal plate is disposed on and around the coupler and is in contact with the lip. The nut is disposed within the bearing compartment and adjoining the seal plate. The nut includes first, second, and third major portions and first and second intermediate portions. Each of the first, second, and third major portions is in the shape of an annular band. The second major portion is disposed axially between the first and third major portions. The third major portion includes a knife edge seal extending radially outward. The first and second intermediate portions include frustums and extend between the first and second major portions and second and third major portions, respectively. The air seal land is sealingly engaged with the third major portion of the nut.

23 Claims, 3 Drawing Sheets

NUT WITH AIR SEAL

BACKGROUND

The present disclosure relates to bearing assemblies in gas turbine engines and more particularly, to a stack nut in a bearing compartment of a gas turbine engine.

In gas turbine engines, bearing compartments include seal components that prevent oil from leaking outside the compartment. Existing seal assemblies in bearing compartments utilize air that is pressurized to a higher level than nearby areas, either as a primary sealing method (e.g., a labyrinth or knife-edge seal) or a secondary seal, adjacent to a carbon seal. A stack nut is typically used to retain various hardware components of the seal assembly such as a retaining ring, key washer, air seal ring, or other hardware. These multiple pieces of hardware create a stacking of tolerances between the different pieces which reduces the efficiency of the seal assembly.

SUMMARY

A seal assembly for a bearing compartment of a gas turbine engine includes a coupler with a lip, a seal plate, a nut, and an air seal land. The coupler is disposed in the bearing compartment. The seal plate is disposed on and around the coupler and is in contact with the lip of the coupler. The nut is disposed within the bearing compartment and adjoining the seal plate. The nut includes first, second, and third major portions and first and second intermediate portions. Each of the first, second, and third major portions is in the shape of an annular band. The first major portion includes threads and presses against the seal plate. The second major portion is disposed axially between the first and third major portions. The third major portion includes a knife edge seal extending radially outward. The first intermediate portion includes a frustum and extends between the first and second major portions. The second intermediate portion includes a frustum and extends between the second and third major portions. The air seal land is disposed within the bearing compartment and is sealingly engaged with the third major portion of the nut.

A nut includes first, second, and third major portions and first and second intermediate portions. Each of the first, second, and third major portions is in the shape of an annular band. The second major portion is disposed axially in between the first and third major portions. The third major portion includes a radially outward extending knife edge seal. The first intermediate portion includes a frustum and extends between the first and second major portions. The second intermediate portion includes a frustum and extends between the second and third major portions.

DETAILED DESCRIPTION

The proposed seal configuration includes a monolithic stack nut that includes integrally formed air seal features (e.g., knife-edge or labyrinth seal). By adding the air seal features to the stack nut, several hardware components are eliminated such as the key washer, retaining ring, and the separate air seal ring. The benefits of the proposed seal configuration include reducing the hardware count, eliminating a separate snap ring (which can be subject to undesirable behavior in an operating engine), reducing repair cost by separating the air seal knife edges onto smaller parts (such as the stack nut) and away from major rotor components, and reducing issues caused by tolerance stack-up to improve the performance of the air seal.

Figure 1:
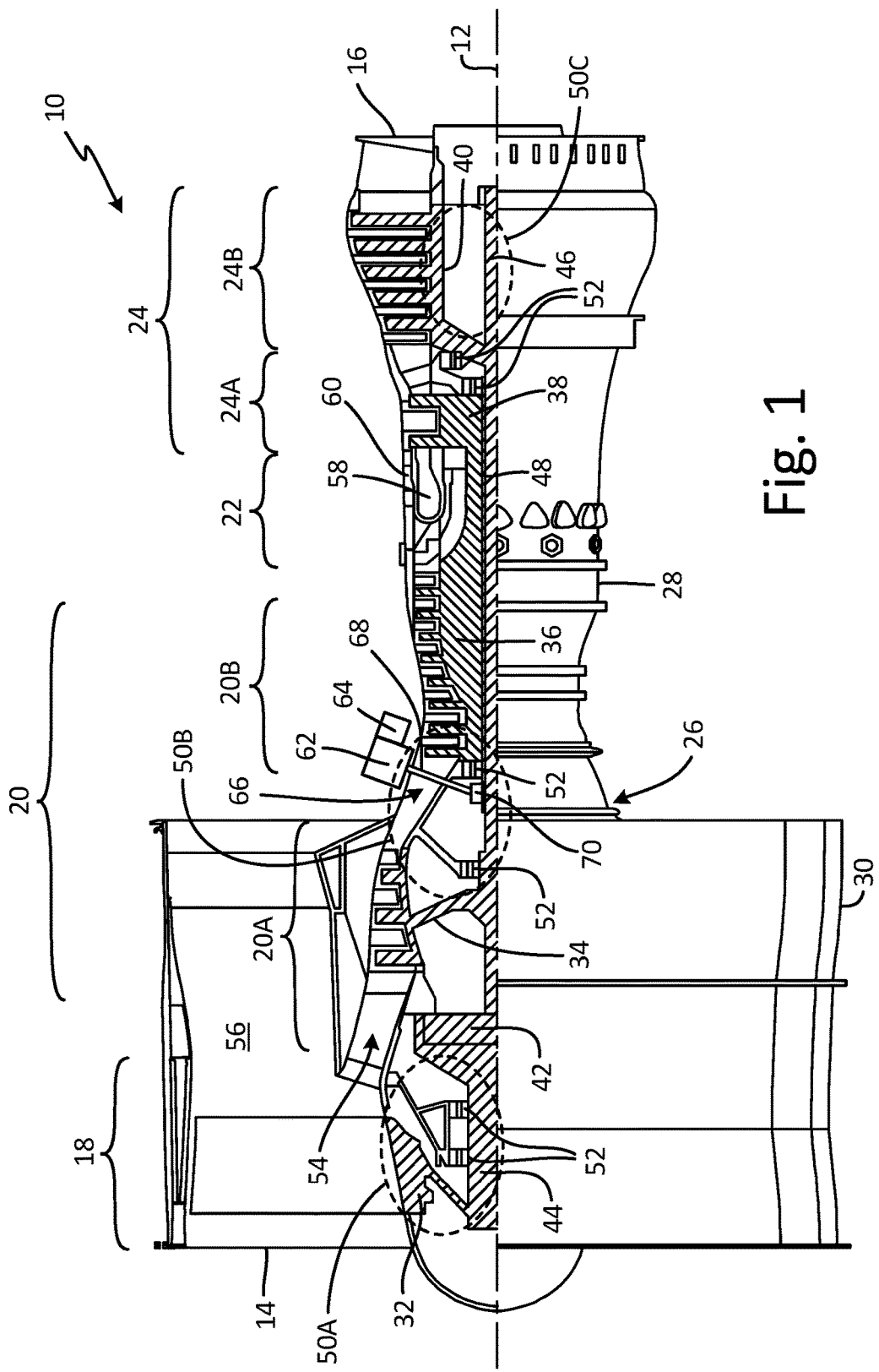
FIG. 1 is a side partial cross-section view of a turbine engine.

FIG. 1 shows a side elevation cutaway view of gas turbine engine 10 and includes axial centerline 12, upstream airflow inlet 14, downstream airflow exhaust 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with inner case 28 (e.g., a core case) and outer case 30 (e.g., a fan case)), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, combustor 60, accessory gearbox 62, gearbox attachments 64, transmission system 66, tower shaft 68, and geared system 70.

Gas turbine engine 10 extends along axial centerline 12 between upstream airflow inlet 14 and downstream airflow exhaust 16. Gas turbine engine 10 includes fan section 18, compressor section 20, combustor section 22, and turbine section 24. Compressor section 20 includes LPC section 20A and HPC section 20B. Turbine section 24 includes HPT section 24A and LPT section 24B.

Fan section 18, compressor section 20, combustor section 22, and turbine section 24 are arranged sequentially along centerline 12 within engine housing 26. Engine housing 26 includes inner case 28 (e.g., a core case) and outer case 30 (e.g., a fan case). Inner case 28 may house one or more of fan section 18, compressor 20, combustor section 22, and turbine section 24 (e.g., an engine core). Outer case 30 may house at least fan section 18. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 32 is connected to gear train 42, for example, through fan shaft 44. Gear train 42 and LPC rotor 34 are connected to and driven by LPT rotor 40 through low speed shaft 46. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut.

During operation, air enters gas turbine engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between inner case 28 and outer case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited and combustion products thereof expand and flow through and sequentially cause HPT rotor 38 and LPT rotor 40 to rotate. The rotations of HPT rotor 38 and LPT rotor 40 drive rotation of LPC rotor 34 and HPC rotor 36, respectively and compression of the air received from core gas path 54. The rotation of LPT rotor 40 also drives rotation of fan rotor 32, which propels bypass air through and out of bypass gas path 56. The propulsion of the bypass air may account for a majority of thrust generated by gas turbine engine 10, which can be more than 75% of engine thrust. Gas turbine engine 10 of the present disclosure, however, is not limited to the foregoing exemplary thrust ratio.

Gas turbine engine 10 of FIG. 1 also includes accessory gearbox 62, one or more gearbox attachments 64 and transmission system 66 in a mid-bearing compartment between LPC section 20A and HPC section 20B. Accessory gearbox 62 is mounted to inner case 28. However, in alternative embodiments, accessory gearbox 62 may be mounted elsewhere with gas turbine engine 10, such as to outer case 30. Accessory gearbox 62 is configured to transfer rotational energy (e.g., torque) between transmission system 66 and the one or more gearbox attachments 64. An example of an accessory gearbox is disclosed in U.S. Pat. No. 9,068,515 to Duong et al., which is assigned to the assignee of the present application. Examples of a gearbox attachment may include an air turbine starter, a de-oiler, a hydraulic pump, an oil pump, an integrated drive generator, a permanent magnet alternator and a fuel pump module. The present disclosure is not limited to including the foregoing exemplary types or configurations of accessory gearbox 62 or gearbox attachments 64.

Transmission system 66 is configured to mechanically couple and thereby transfer rotational energy (e.g., torque) between a rotating assembly (or component) of gas turbine engine 10 and accessory gearbox 62. In particular, transmission system 66 of FIG. 1 mechanically couples one of the low speed spool or high speed spool of gas turbine engine 10 to the accessory gearbox 62. Transmission system 66 includes high speed shaft 48, tower shaft 68, and geared system 70.

Figure 2:
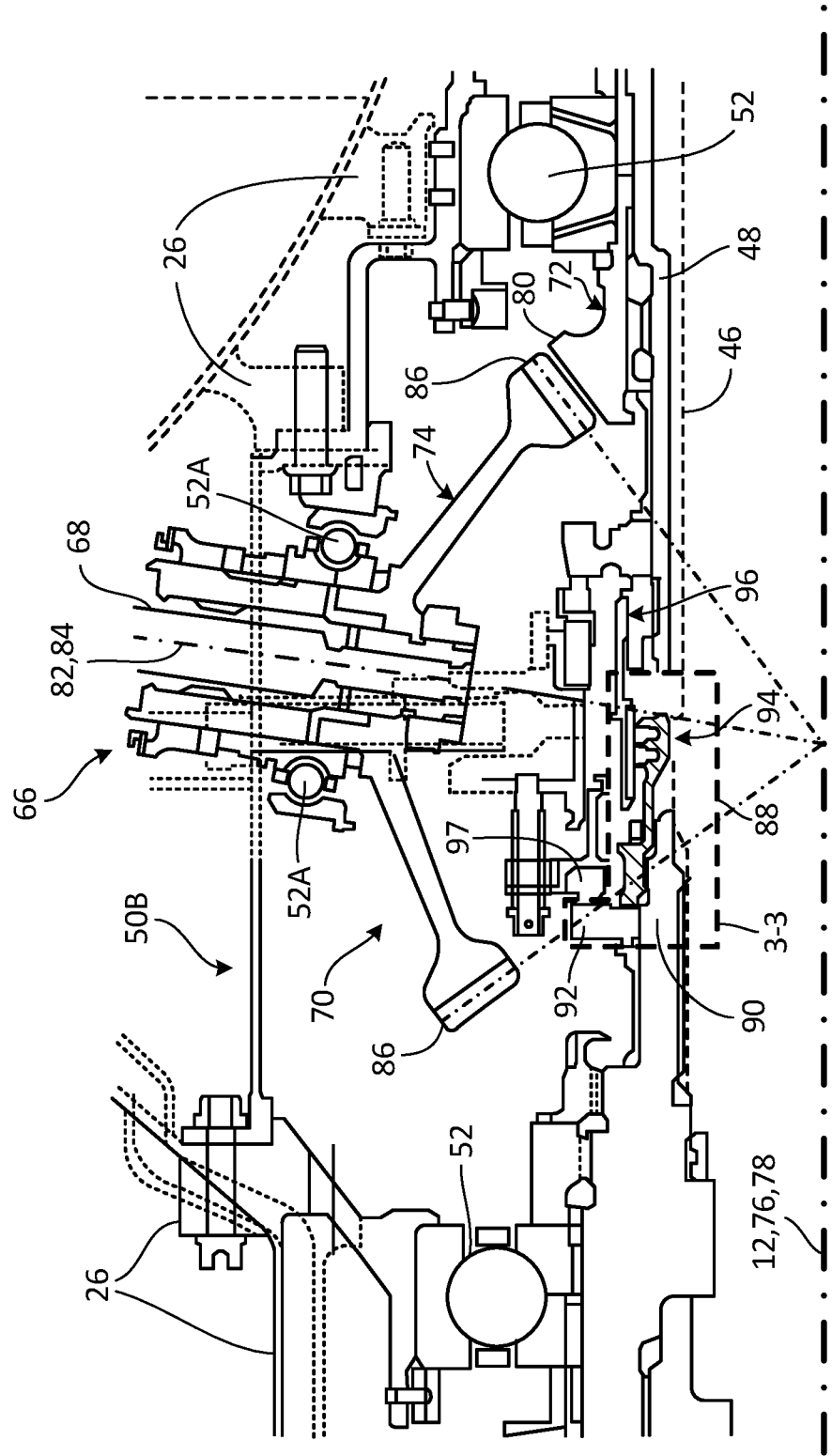
FIG. 2 is an enlarged cross-section view of a bearing compartment of the turbine engine.

FIG. 2 shows an enlarged cross-section view of bearing compartment 50B of turbine engine 10 and includes bearings 52 and 52A, low speed shaft 46 (shown in phantom for clarity), high speed shaft 48, transmission system 66, geared system 70 (with first gear 72, second gear 74, rotational axis 76 of first gear 72, rotational axis 78 of low speed shaft 46, first set of gear teeth 80, rotational axis 82 of second gear 74, rotational axis 84 of tower shaft 68, and second set of gear teeth 86), seal assembly 88 (with coupler 90, seal plate 92, stack nut 94, and air seal land 96), and stationary seal component 97.

Transmission system 66 is within bearing compartment 50B (e.g., a mid-bearing compartment of gas turbine engine 10) and includes geared system 70, which contains first gear 72 and second gear 74. In other non-limiting embodiments, bearing compartment 50B can include other bearing compartments besides a mid-bearing compartment, such as a forward or aft bearing compartment. FIG. 2 shows high speed shaft 48 adjacent to low speed shaft 46 on a radially inner side and to bearing 52 and first gear 72 on a radially outer side. In turn, bearing 52 is connected to engine housing 26. First gear 72 of FIG. 2 is configured as a bevel gear and, in particular, a bull gear. First gear 72 is mounted to high speed shaft 48, for example, by a splined interface. First gear 72 rotates around rotational axis 76, which is coaxial with rotational axis 78 of low speed shaft 46 and centerline 12. FIG. 2 also shows tower shaft 68 connected to second gear 74 and held in place by bearings 52A connected to engine housing 26.

Second gear 74 of FIG. 2 is configured as a bevel gear and is mounted to tower shaft 68, for example, by a splined interface. Second gear 74 rotates around rotational axis 82, which is coaxial with rotational axis 84 of tower shaft 68. Rotational axis 84 is arranged coincident with the rotational axis 76 of first gear 72. Additionally, FIG. 2 shows an angle of rotational axis 84 of tower shaft 68 to be approximately 80° to centerline 12 (e.g., 10° to perpendicular), but in other non-limiting embodiments can be at another angle such as perpendicular to centerline 12.

Seal assembly 88 includes coupler 90, seal plate 92, stack nut 94, and air seal land 96. Coupler 90 is an annular coupler with elements for mechanical engagement and is configured to rotate within gas turbine engine 10. Seal plate 92 is an annular seal element such as a carbon seal. Stack nut 94 is a threaded nut with a portion including air seal elements (discussed further below). Air seal land 96 is an annular seal element such as an abradable seal component. Stationary seal component 97 is an annular, ring-shaped seal element.

Seal plate 92 is disposed on and around coupler 90. Stack nut 94 is attached to and threadably engaged with coupler 90. In other non-limiting embodiments, stack nut 94 can be attached to a main shaft of gas turbine engine 10 or other rotating shafts such as fan shaft 44, low speed shaft, 46, high speed shaft 48, or tower shaft 68. Stack nut 94 is screwed onto coupler 90 such that stack nut 94 is drawn closer to seal plate 92 and presses against seal plate 92 against a portion of coupler 90. Stack nut 94 adjoins (or is adjoining) seal plate 92. A portion of stack nut 94 is engaged with air seal land 96 to form a seal. In one non-limiting embodiment, the interface between stack nut 94 and air seal land 96 is configured to create an air-to-air seal. The seal interface between stack nut 94 and air seal land 96 prevent oil and/or air from leaking out of or into bearing compartment 50B. Stationary seal component 97 is in contact and sealingly engaged with seal plate 92

As will be discussed with FIG. 3, the single piece configuration of stack nut 94, which includes an integral seal element (e.g., knife edge seal), decreases the number of hardware components typically used in an existing seal assembly with a separate stack nut and seal element.

Figure 3:
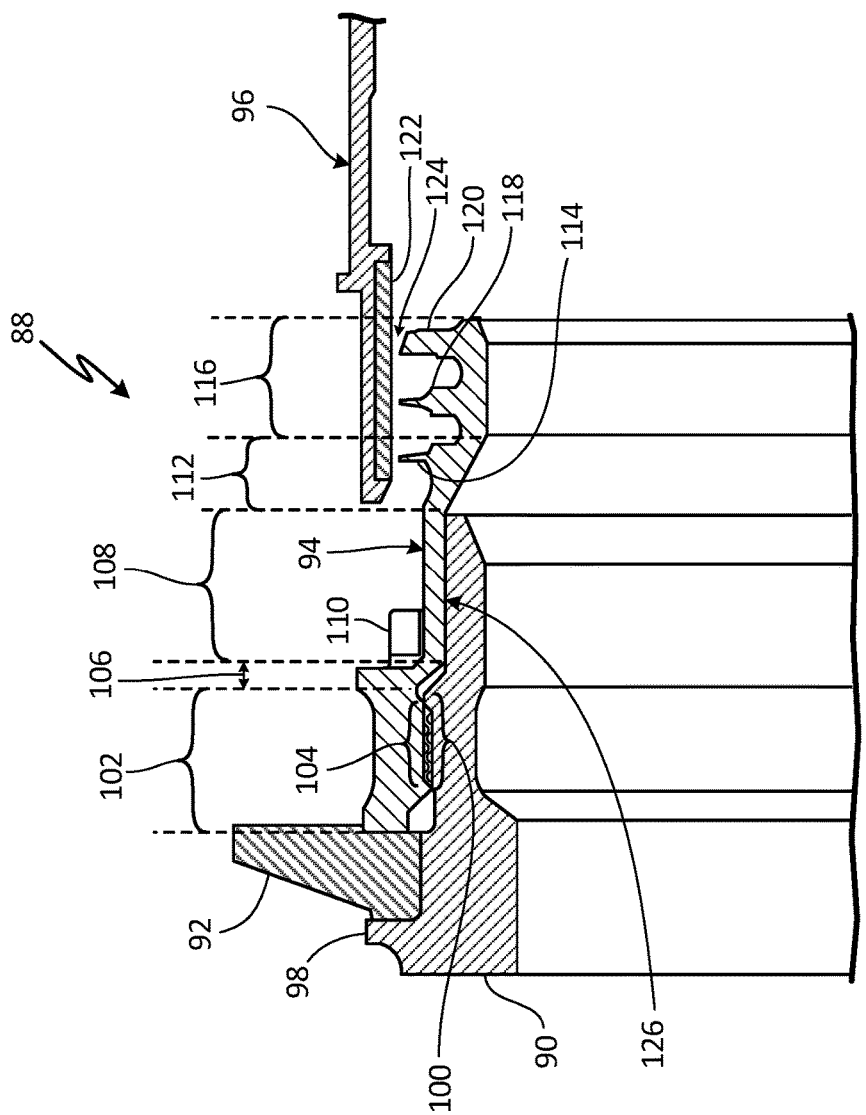
FIG. 3 is an enlarged cross-section view of a bearing assembly of the bearing compartment designated by box 3-3 in FIG. 2.

FIG. 3 shows an enlarged cross-section view of seal assembly 88 with stack nut 94 and air seal land 96 designated by box 3-3 in FIG. 2, which includes coupler 90 (with lip 98 and threaded portion 100), first major portion 102 (with threaded portion 104), first intermediate portion 106, second major portion 108 (with lug 110), second intermediate portion 112 (with knife edge seal 114), third major portion 116 (with knife edge seal 118 and discourager 120, abradable portion 122 of air seal land 96, gap 124, and pilot feature 126.

Lip 98 is an annular ring of solid material projecting radially outward from coupler 90. In other non-limiting embodiments, lip 98 can include a non-annular configuration such as an interrupted configuration with window features to provide additional air management functionality. Threaded portion 100 is a portion of coupler 90 with helical threads. First major portion 102, second major portion 108, and third major portion 116 are annular rings of solid material. In other non-limiting embodiments, first, second, and third major portions 102, 108, and 116 can include non-annular, circumferentially discrete elements or window features to provide additional air management functionality. Threaded portion 104 is a portion of first major portion 102 with helical threads. In other non-limiting embodiments, threaded portion 104 and threaded portion 100 can include non-annular, circumferentially discrete elements forming an interrupted cage configured for threaded engagement with threaded portion 100, or threaded portion 104 respectively. First intermediate portion 106 and second intermediate portion 112 are annular frustums. Lug 110 is a tab of solid material. Knife edge seals 114 and 118 are knife edges. In other non-limiting embodiments, knife edge seals 114 and/or 118 can include other types of seal components such as a labyrinth seal or other type of seal. Discourager 120 is a ring of solid material extending radially outward from stack nut 94. Abradable portion 122 is an abradable material such as a honeycomb. Gap 124 is a space between abradable portion 122 and knife edge seals 114, 118. Pilot feature 126 is a gap between coupler 90 and second major portion 112 of stack nut 94.

Lip 98 is disposed around and attached to coupler 90. In one non-limiting embodiment, lip 98 is integrally formed as a part of coupler 90. Threaded portion 100 is disposed along a radially outward surface of coupler 90 and is threadably engaged with threaded portion 104 of stack nut 94. First major portion 102 is disposed on a first axial end of stack nut 94 and is connected to first intermediate portion 106. In one non-limiting embodiment, seal plate 92 can be integrally formed with first major portion 102 of stack nut 94 such that seal plate 92 and stack nut 94 form a single, monolithic piece of material. In another non-limiting embodiment, coupler 90, seal plate 92, and stack nut 94 are formed as a single, monolithic piece of material such as aluminum, steel, other types of metallic alloys, as well as composites and ceramics. Threaded portion 104 is disposed along a radially inward surface of first major portion 102 and is threadably engaged with threaded portion 100 of coupler 90.

First intermediate portion 106 extends axially between and is connected to first major portion 102 and second major portion 108. Second major portion 108 is disposed axially between and is connected to first intermediate portion 106 and second intermediate portion 112. Lug 110 is connected to second major portion 108 of stack nut 94. In another non-limiting embodiment, lug 110 is connected to first intermediate portion 106 of stack nut 94. Second intermediate portion 112 extends axially between and is connected to second major portion 108 and third major portion 116. Knife edge seal 114 is connected to and extends radially outward from second intermediate portion 112 of stack nut 94. Knife edge seal 114 is engaged with abradable portion 122 of air seal land 96.

Third major portion 116 is disposed on a second axial end of stack nut 94 opposite first major portion 102 and is connected to second intermediate portion 112. Third major portion 116 is disposed radially inward from air seal land 96. Knife edge seal 118 is connected to and extends radially outward from third major portion 116 of stack nut 94. Knife edge seal 118 is sealingly engaged with abradable portion 122 of air seal land 96. Discourager 120 is disposed on and extends radially outward from stack nut 94. Abradable portion 122 is connected to air seal land 96 and is sealingly engaged with knife edge seal 118 of third major portion 116. Gap 124 extends radially between abradable portion 122 and knife edge seals 114, 118. Pilot feature 126 extends radially between coupler 90 and second major portion 112 of stack nut 94.

Stack nut 94 threadably engages with and screws onto coupler 90 to press seal plate 92 against lip 98 of coupler 90. By pressing seal plate 92 against lip 98 of coupler 90, stack nut 94 retains seal plate 92 on coupler 90 and within bearing compartment 50B.

During operation of gas turbine engine 10, coupler 90 rotates relative to bearing housing 50B. As coupler 90 rotates, seal plate 92 and stack nut 94 rotate with coupler 90. Seal plate 92 forms a sealing interface with corresponding stationary seal component 97 (shown in FIG. 2) and knife edge seals 114 and 118 of stack nut 94 form sealing interfaces with abradable portion 122 of air seal land 96. In one non-limiting embodiment, at least one of knife edge seal 118 of third major portion 116 and knife edge seal 114 of second major portion 108 form an air-to-air seal with abradable portion 122 of air seal land 96. In other non-limiting embodiments, either knife edge seal 118 of third major portion 116 or knife edge seal 114 of second major portion 108 can form an air-to-liquid seal with abradable portion 122 of air seal land 96 that is configured to prevent leakage of either air or a liquid. Knife edge seals 114 and 118 are configured to abrade abradable portion 122 as knife edge seals 114 and 118 rotate relative to abradable portion 122 of air seal land 96.

Typically, air seals (e.g., a knife seal component) used in bearing compartments are configured separately from the stack nut used for hardware retention. These existing air seals are often attached to adjacent hardware with retaining features, such as a stack nut, key washer or other retention methods requiring a number of pieces of hardware subject to undesirable behavior during operating of the engine and which add weight to the seal assembly.

Stack nut 94 includes a monolithic configuration with integrally formed air seal features (e.g., knife edge seals 114 and 118, discourager 120, or a labyrinth seal). By integrally forming knife edge seals 114 and 118 with stack nut 94, several hardware components are eliminated such as a key washer, retaining ring, and separate air seal ring which are often required in existing seal configurations. The benefits of stack nut 94 include reducing the hardware count of seal assembly 88, eliminating a separate snap ring (which is subject to undesirable behavior during operating of the engine, e.g., vibration modes), reducing repair cost by separating the air seal knife edges onto smaller parts (such as stack nut 94) and away from major rotor components, and reducing issues caused by tolerance stack-up of the hardware to improve performance of seal assembly 88.

In existing seal assembly designs, a stack nut is mainly used for the fastening of a stack of hardware including a knife edge seal used for sealing an air-air or air-oil interface. Seal assembly 88 makes for a reduction of hardware and also smaller packaging around stack nut 94 and air seal component 96. One benefit of this reduction in hardware is a reduction in a diameter of air seal assembly 88. Without stack nut 94, the air seal component (such as a knife edge seal) would have to be fastened onto the stack nut, or both parts would have to be fastened onto the coupler. Each set of fasteners moves the parts outboard (increasing the diameter of the stack nut, the knife edge seal, and the flow discourager), creating a larger annulus (by placing the gap at a larger diameter), and thereby reducing the effectiveness of the seal by creating a larger cross-sectional area (e.g., annulus) for the fluid to flow through.

Additionally, in existing seal assembly designs with the air-seal being fastened onto the stack nut, a pilot feature of the stack nut would be affected by some tolerances of the locating feature of the rotor mating with the stack nut. In a similar fashion, there would then be another pilot feature on the stack nut used to locate the nut. Seal assembly also allows for stack nut 94 and knife edge seal 118 to share locating features with pilot feature 126. Pilot feature 126 used for locating stack nut 94 now locates the air-seal configuration better, allowing for a truer center, and less rubbing and deterioration caused by off-center abrasion of knife edge seal 118 and air seal component 96 due to stack nut 94 rotating at different speeds or in an opposite direction relative to seal component 96.

With seal assembly 88, the tolerance between the locating features on stack nut 94 to locate the air-seal is essentially eliminated. Elements of seal assemblies already include tight tolerances, and in most cases is uneconomical to reduce their tolerance further to meet an "ideal" zero tolerance hardware design. Seal assembly 88 with stack nut 94 reduces the amount of tolerances between the parts without significantly increasing costs.

In general, existing knife edge air seals lose their performance through abrasive wear between the knife-edge and the air-seal land. Smaller packaging (e.g., size of hardware surrounding and a part of seal assembly 88) allows an interface between knife edge seal 118 and air seal component 96 to exist at a smaller diameter, reducing the diameter of the interface. This reduction leads to a direct reduction in gap 124 that exists between knife edge seal 118 and air seal component 96, through which fluid such as air and/or oil can leak. The smaller diameter of the interface between knife edge seal 118 and air seal component 96 will provide a reduction in gap 124 between knife edge seal 118 and air seal component 96 even with wear and gap 124 widens.

Stack nut 94 also reduces the degree of the eccentricity (e.g., degree of being off-center) between knife edge seal 118 and air seal component 96 due to the reduction in stacking of tolerances. This additional reduction in eccentricity provided by seal assembly 88 will reduce the wear on the interface between knife edge seal 118 and air seal component 96. This also prevents a scenario possible with existing designs, where the air-seal and stack nut fastener come loose (e.g., during periods of high vibration experienced by gas turbine engine 10), and the air-seal is effectively lost when the fastener releases the air-seal.

Seal assembly 88 also provides for a sturdier base for knife edge seal (by being part of stack nut 94) to be more easily designed out of a potentially problematic range of vibrations. In other words, stack nut 94 is now less likely to vibrate during operation of gas turbine engine 10, because there is a larger margin between the operating frequency of gas turbine engine 10 and natural frequency of the elements of seal assembly 88.

Discussion of Possible Embodiments

The following are non-exclusive descriptions of possible embodiments of the present invention.

A seal assembly for a bearing compartment of a gas turbine engine includes a coupler with a lip, a seal plate, a nut, and an air seal land. The coupler is disposed in the bearing compartment. The seal plate is disposed on and around the coupler and is in contact with the lip of the coupler. The nut is disposed within the bearing compartment and adjoining the seal plate. The nut includes first, second, and third major portions and first and second intermediate portions. Each of the first, second, and third major portions is in the shape of an annular band. The first major portion includes threads and presses against the seal plate. The second major portion is disposed axially between the first and third major portions. The third major portion includes a knife edge seal extending radially outward from the third major portion. The first intermediate portion includes a frustum and extends between the first and second major portions. The second intermediate portion includes a frustum and extends between the second and third major portions. The air seal land is disposed within the bearing compartment and is sealingly engaged with the third major portion of the nut.

The seal assembly of the preceding paragraph can optionally include, additionally and/or alternatively, any one or more of the following features, configurations and/or additional components.

A portion of the nut can be disposed radially inward from and sealingly engaged with the air seal land.

The air seal land can comprise an abradable portion sealingly engaged with the knife edge seal of the third major portion.

The second intermediate portion can comprise a knife edge seal extending radially outward.

At least one of the knife edge seal of the third major portion and the knife edge seal of the second major portion form an air-to-air seal with the abradable portion of the air seal land.

The seal plate can comprise portion of a carbon seal assembly.

The first major portion of the nut can be threadably engaged with the coupler.

A nut includes first, second, and third major portions and first and second intermediate portions. Each of the first, second, and third major portions is in the shape of an annular band. The second major portion is disposed axially in between the first and third major portions. The third major portion includes a radially outward extending knife edge seal. The first intermediate portion includes a frustum and extends between the first and second major portions. The second intermediate portion includes a frustum and extends between the second and third major portions.

The nut of the preceding paragraph can optionally include, additionally and/or alternatively, any one or more of the following features, configurations and/or additional components.

The first major portion includes threads.

The second intermediate portion can comprise a knife edge seal.

The nut can be disposed in a bearing compartment of a gas turbine engine.

The nut can be configured to threadably engage with a coupler of a seal assembly disposed in the bearing compartment of the gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A seal assembly for a bearing compartment of a gas turbine engine, the seal assembly comprising:
   a coupler with a lip, wherein the coupler is disposed in the bearing compartment;
   a seal plate disposed on and around the coupler, wherein the seal plate is in contact with the lip of the coupler;
   a nut disposed within the bearing compartment and adjoining the seal plate, the nut comprising:
      a first major portion in the shape of an annular band, wherein the first major portion presses against the seal plate, wherein the first major portion includes threads, and wherein the first major portion of the nut is threadably engaged with the coupler;
      a second major portion in the shape of an annular band;
      a third major portion in the shape of an annular band that includes a knife edge seal extending radially outward from the third major portion, wherein the second major portion is disposed axially between the first and third major portions;
      a first intermediate portion extending between the first and second major portions, wherein the first intermediate portion includes a frustum;
      a second intermediate portion extending between the second and third major portions, wherein the second intermediate portion includes a frustum; and
   an air seal land disposed within the bearing compartment and sealingly engaged with the third major portion of the nut.

2. The seal assembly of claim 1, wherein a portion of the nut is disposed radially inward from and sealingly engaged with the air seal land.

3. The seal assembly of claim 2, wherein the air seal land comprises an abradable portion sealingly engaged with the knife edge seal of the third major portion.

4. The seal assembly of claim 1, wherein the second intermediate portion comprises a knife edge seal extending radially outward.

5. The seal assembly of claim 4, wherein at least one of the knife edge seal of the third major portion and the knife edge seal of the second major portion form an air-to-air seal with the abradable portion of the air seal land.

6. The seal assembly of claim 1, wherein the seal plate comprises a portion of carbon seal assembly.

7. A nut comprising:
   a first major portion in the shape of an annular band;
   a second major portion in the shape of an annular band;
   a third major portion in the shape of an annular band and including a radially outward extending knife edge seal, wherein the second major portion is disposed axially in between the first and third major portions;
   a first intermediate portion extending between the first and second major portions, wherein the first intermediate portion includes a frustum; and
   a second intermediate portion extending between the second and third major portions, wherein the second intermediate portion comprises a knife edge seal, wherein the second intermediate portion includes a frustum.

8. The nut of claim 7, wherein the first major portion includes threads.

9. The nut of claim 7, wherein the nut is disposed in a bearing compartment of a gas turbine engine.

10. The nut of claim 9, wherein the nut is configured to threadably engage with a coupler of a seal assembly disposed in the bearing compartment of the gas turbine engine.

11. A nut comprising:
   a first major portion in the shape of an annular band;
   a second major portion in the shape of an annular band;
   a third major portion in the shape of an annular band and including a radially outward extending knife edge seal, wherein the second major portion is disposed axially in between the first and third major portions;
   a first intermediate portion extending between the first and second major portions, wherein the first intermediate portion includes a frustum; and
   a second intermediate portion extending between the second and third major portions, wherein the second intermediate portion includes a frustum, wherein the nut is configured to threadably engage with a coupler of a seal assembly disposed in the bearing compartment of the gas turbine engine.

12. The nut of claim 11, wherein the first major portion includes threads.

13. The nut of claim 11, wherein the second intermediate portion comprises a knife edge seal.

14. The nut of claim 13, wherein the third major portion is configured to sealingly engage with an air seal land disposed within a bearing compartment.

15. The nut of claim 14, wherein at least one of the knife edge seal of the third major portion and the knife edge seal of the second major portion form an air-to-air seal with an abradable portion of an air seal land.

16. The nut of claim 13, wherein the knife edge seal of the second intermediate portion extends radially outward.

17. The nut of claim 11, wherein the nut is disposed in a bearing compartment of a gas turbine engine.

18. The nut of claim 11, wherein the first major portion of the nut is configured to threadably engage with a coupler.

19. A seal assembly for a bearing compartment of a gas turbine engine, the seal assembly comprising:
   a coupler with a lip, wherein the coupler is disposed in the bearing compartment;
   a seal plate disposed on and around the coupler, wherein the seal plate is in contact with the lip of the coupler;
   a nut disposed within the bearing compartment and adjoining the seal plate, the nut comprising:
      a first major portion in the shape of an annular band, wherein the first major portion presses against the seal plate, further wherein the first major portion includes threads;
      a second major portion in the shape of an annular band;
      a third major portion in the shape of an annular band that includes a knife edge seal extending radially outward from the third major portion, wherein the second major portion is disposed axially between the first and third major portions;
      a first intermediate portion extending between the first and second major portions, wherein the first intermediate portion includes a frustum;
      a second intermediate portion extending between the second and third major portions, wherein the second intermediate portion includes a frustum, wherein the second intermediate portion comprises a knife edge seal extending radially outward; and
   an air seal land disposed within the bearing compartment and sealingly engaged with the third major portion of the nut.

20. The seal assembly of claim 19, wherein a portion of the nut is disposed radially inward from and sealingly engaged with the air seal land.

21. The seal assembly of claim 20, wherein the air seal land comprises an abradable portion sealingly engaged with the knife edge seal of the third major portion.

22. The seal assembly of claim 19, wherein at least one of the knife edge seal of the third major portion and the knife edge seal of the second major portion form an air-to-air seal with the abradable portion of the air seal land.

23. The seal assembly of claim 19, wherein the seal plate comprises a portion of carbon seal assembly.

\* \* \* \* \*